(12) United States Patent
Vuong et al.

(10) Patent No.: US 6,785,722 B2
(45) Date of Patent: Aug. 31, 2004

(54) APPARATUS, METHODS, AND COMPUTER PROGRAM PRODUCTS FOR TRANSACTIONAL SUPPORT OF NETWORK MANAGEMENT OPERATIONS

(75) Inventors: Tony T. Vuong, Milpitas, CA (US); Subodh Bapat, Palo Alto, CA (US); Gerard Horan, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/045,491

(22) Filed: Mar. 20, 1998

(65) Prior Publication Data

US 2002/0013846 A1 Jan. 31, 2002

(51) Int. Cl.[7] .................. G06F 15/173; G06F 15/16; G06F 9/00
(52) U.S. Cl. .................. 709/223; 709/202; 718/101; 718/102
(58) Field of Search ............... 709/201, 102, 709/103, 303, 304, 223, 224, 226, 228, 202

(56) References Cited

U.S. PATENT DOCUMENTS

| | | | | |
|---|---|---|---|---|
| 5,063,500 A | * | 11/1991 | Shorter | 709/226 |
| 5,133,075 A | * | 7/1992 | Risch | 707/201 |
| 5,295,256 A | | 3/1994 | Bapat | 395/500 |
| 5,317,742 A | | 5/1994 | Bapat | 395/700 |
| 5,398,336 A | * | 3/1995 | Tantry et al. | 707/103 |
| 5,548,724 A | * | 8/1996 | Akizawa et al. | 709/200 |
| 5,644,720 A | * | 7/1997 | Boll et al. | 709/227 |
| 5,758,072 A | * | 5/1998 | Filepp et al. | 709/220 |
| 5,781,743 A | * | 7/1998 | Matsuno et al. | 709/228 |
| 5,832,516 A | * | 11/1998 | Bamford et al. | 707/202 |
| 5,845,080 A | * | 12/1998 | Hamada et al. | 709/224 |
| 5,956,488 A | * | 9/1999 | Suzuki | 709/219 |
| 5,958,004 A | * | 9/1999 | Helland et al. | 709/101 |
| 6,014,666 A | * | 1/2000 | Helland et al. | 707/9 |
| 6,052,763 A | * | 4/2000 | Maruyama | 711/152 |
| 6,272,536 B1 | * | 8/2001 | van Hoff et al. | 709/217 |
| 6,324,576 B1 | * | 11/2001 | Newcombe et al. | 709/223 |

OTHER PUBLICATIONS

"SNMP, SNMPv2, SNMPv3, and RMON 1 and 2", 3rd ed., William Stallings, Addison–Wesley, 1999.*
"SNMP, SNMPv2, and RMON", 2d ed., William Stallings, Addison–Wesley, 1996.*

* cited by examiner

*Primary Examiner*—Paul Kang
(74) *Attorney, Agent, or Firm*—Meyertons Hood Kivlin Kowert & Goetzel, P.C.; B. Noël Kivlin

(57) ABSTRACT

An application transaction (AT) server collects multiple user specified application operations for processing as a single application transaction and records essential information about each transaction being performed in a database. Such recordation enables the values of objects targeted by the particular application transaction prior to completion of a transaction to be restored in case of failed operation of the application transaction.

64 Claims, 15 Drawing Sheets

Key to FIG.'s 6,7,8

APPARATUS, METHODS, AND COMPUTER PROGRAM PRODUCTS FOR TRANSACTIONAL SUPPORT OF NETWORK MANAGEMENT OPERATIONS

COPYRIGHTS IN PATENT MATERIALS

Portions of this patent document contain material subject to copyright restriction. The copyright owner has no objection to facsimile reproduction of the patent document after grant, as it appears in the U.S. Patent and Trademark Offices files or records, but otherwise reserves all rights relating thereto.

TECHNICAL FIELD

The field of this application relates to apparatus, methods, and computer program products relating to network management operations and particularly to apparatus, methods, and computer program products for providing transactional support for network management operations.

BACKGROUND OF THE INVENTION

Particular current network management applications conduct individual network management operations on remote network objects taken one at a time. Remote network objects accordingly receive individual attention at discrete separated times only. The target network objects, however, are numerous, complex, and interrelated. Managing network objects one at a time is unfortunately slow and often ineffective. In many cases, desired object interactions cannot be induced to cooperative action by addressing the target objects individually in isolation from other target objects. To overcome this technical problem, the target objects need to be addressed more comprehensively by making real time adjustments upon multiple remote network objects which are interrelated and interdependent.

At present, network management applications build and send network management operations to network objects one operation at a time. Particular current network management protocols lack the capability of performing a sequence of heterogeneous network management operations over a number of managed objects such that this sequence of operations is committed either atomically or not at all. It therefore becomes the responsibility of a network management platform to attempt to provide transactional integrity around a sequence of heterogeneous network management operations. However, no known network management protocol, platform, or product has any built-in mechanism to provide for the atomic execution of an arbitrary sequence of network management operations within the context of a single transaction.

SUMMARY OF THE INVENTION

According to the present invention, an application transaction is implemented as a group of network management request operations which are bound together into a single atomically-committed transaction. An application transaction thus binds together several message request operations and is committed atomically. The combined transaction is further, on the request of the network management application, aborted atomically according to the present invention. An application transaction according to one embodiment of the present invention combines a plurality of network management requests in a single comprehensive bound application transaction which is delimited by a semantic begin transaction directive and either a commit or a roll-back directive, which maintains transactional integrity of multiple user applications including a plurality of network management requests relating to these applications and message operations which are bound into a single application transaction.

According to the present invention, a mechanism for a network management platform enables a user to specify transactional delimiters around an arbitrary sequence of heterogenous management requests. The platform according to the present invention ensures that these requests are committed atomically (i.e., all together or not at all).

DETAILED DESCRIPTION OF A PREFERRED MODE

Figure 1A:
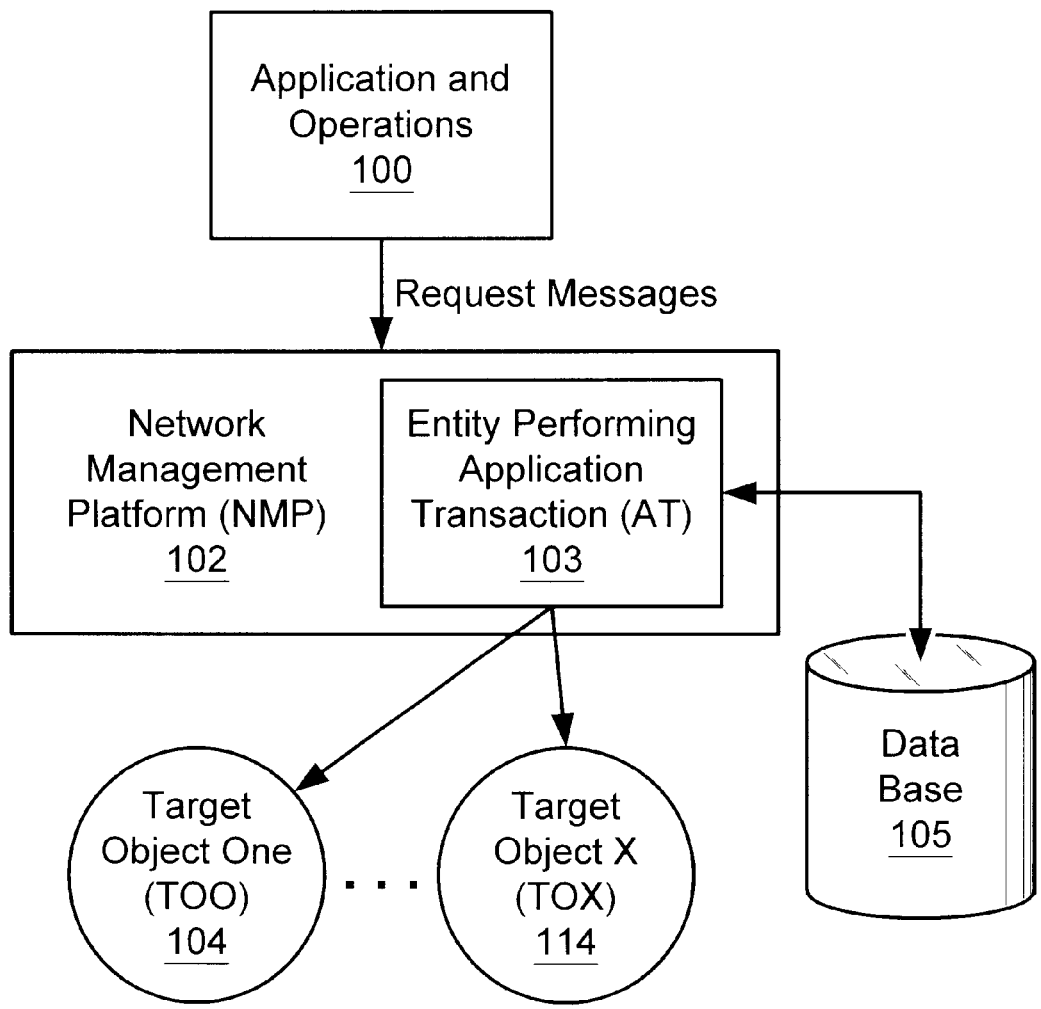
FIG. 1A is a block diagram of a selected application in communication with a network management platform according to the present invention.

FIG. 1A is a block diagram of a selected user application in communication with a network management platform according to the present invention. In particular, FIG. 1A shows a selected user application 100 sending multiple request messages based upon its various operations to a network management platform (NMP) 102. The messages request predetermined performance of a selected application transaction operations directed at selected target objects 104–114, for example. NMP 102 includes a processing entity (software, hardware, firmware or hybrid) for performing application transactions (ATs) 103. An application transaction 103 is mechanism according to the present invention, which is constructed by building a "begin application transaction (AT):" message as detailed below. The AT message constructed is then sent to a network management platform (NMP) 102 which is constructed for handling in accordance with the present invention. An NMP 102 receives multiple request messages from multiple applications according to one embodiment of the present invention. The NMP 102 binds the operations defined in multiple messages together in a single AT according to the present invention and continues to do so until a commit application transaction message is received. The commit message causes synchronous joint commitment of the received message operations. When a "roll-back AT" message is received, the binding of operations to each other and message operations themselves are aborted. The user is provided with AT context messages according to one embodiment of the present invention including for example such messages as "begin AT", "commit AT", and "roll-back AT." Processing entity 103 is in communication with a database 105 according to one embodiment of the present invention. User applications 100 send request messages to the NMP 102, according to the following example:

EXAMPLE

| // Begin Application Transaction |
| --- |
| ... |
| // Set Object A, attribute a1 |
| ... |
| // Set Object C, attribute c1 |
| ... |
| // Commit Application Transaction |

Thus, according to the present invention, a plurality of requests are built (i.e., combined) and sent as a single application transaction which is atomic. By atomic, it is meant that when the transaction either commits or fails, all of its operations which have been combined into the single atomic transaction commit or fail in unison. The transaction is bound to all operational objects whether individually specified or indirectly scoped.

Figure 1B:
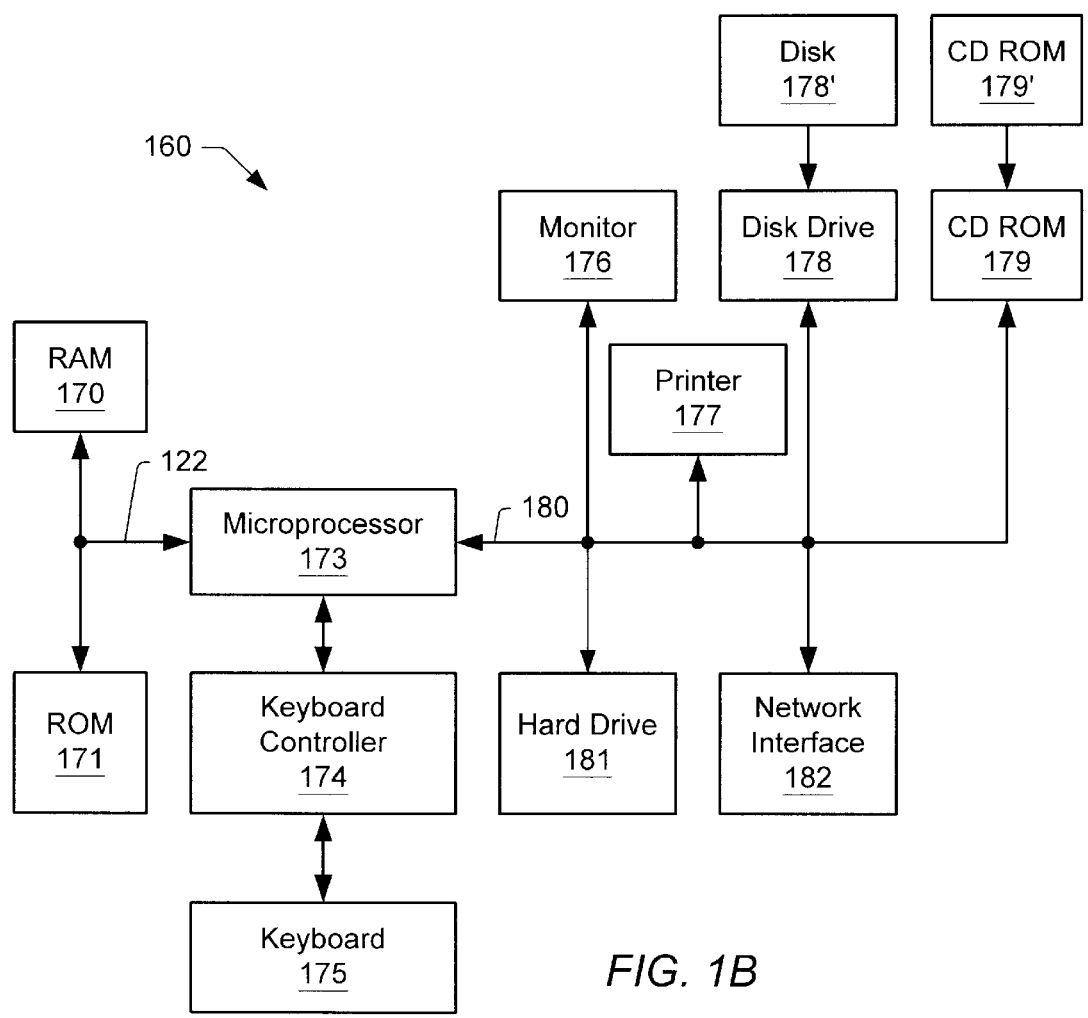
FIG. 1B is a block diagram of a computer system for implementing an embodiment of the present invention.

FIG. 1B is a block diagram of a computer system for implementing an embodiment of the present invention in which each server and application is implemented jointly or separately on one or more computer systems. Computer system 160 particularly includes a random access memory (RAM) 170; a read only memory (ROM) 171; a memory bus 172 connected to RAM 170 and ROM 171; a microprocessor 173 connected to the memory bus 172; a monitor 176; a printer 177; a disk drive 178; a compact disk read only memory (CD ROM) drive 179; a peripheral bus 180 connected to monitor 176, printer 177, disk drive 178, and CD ROM drive 179; a hard drive 181; and a network interface, each connected to peripheral bus 180 as shown in FIG. 1B. Disk drive 178 and CD ROM drive 179 are respectively able to read information including computer program products (not shown) which can be embedded on media such as, respectively, a magnetic or optical disk or floppy 178' and a CD ROM medium 179'. Depending upon the selected drive and medium, writing on the selected medium as well as reading can be accomplished.

Figure 2:
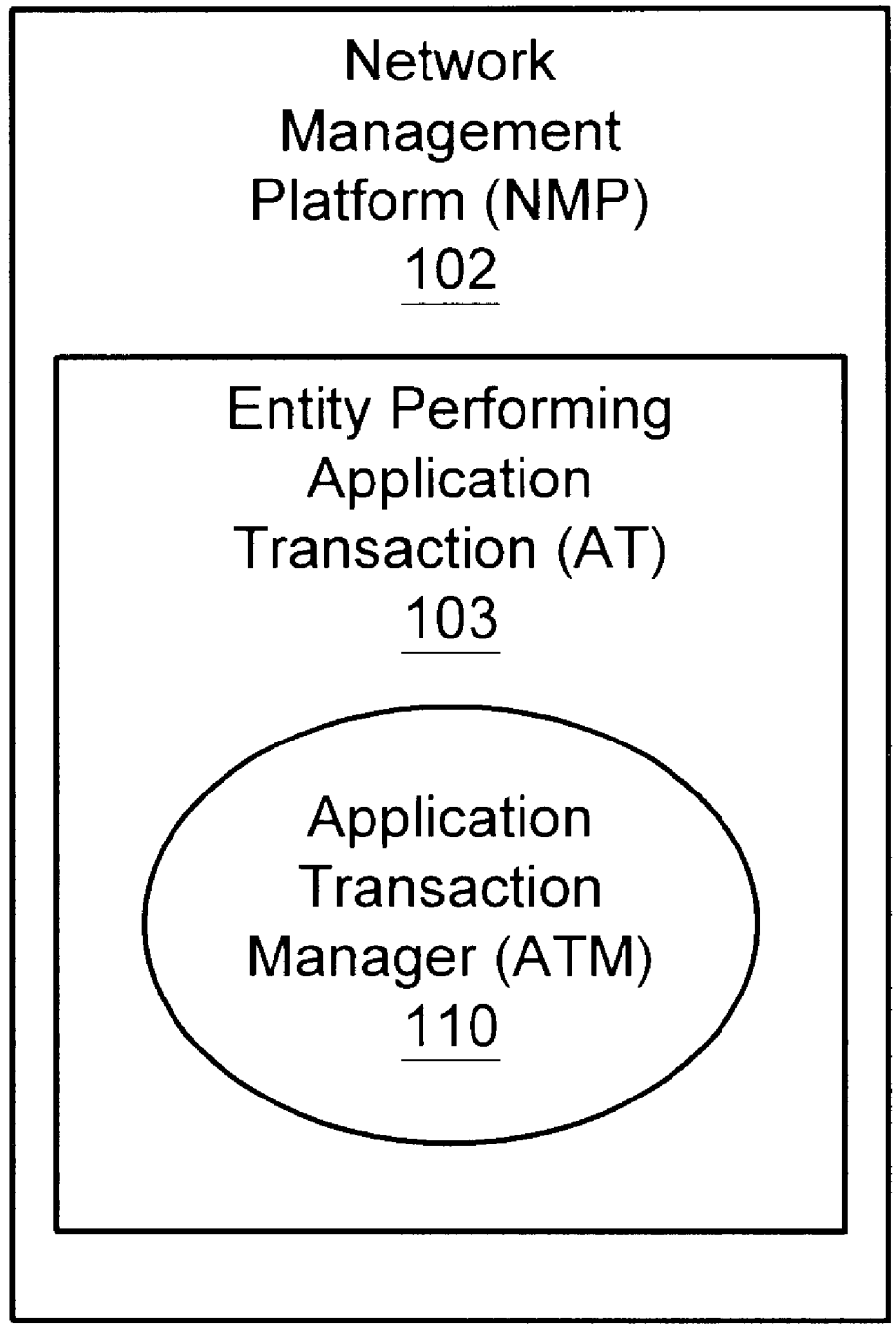
FIG. 2 is a block diagram of a network management platform according to the present invention.

FIG. 2 is a block diagram of a network management platform (NMP) according to the present invention. In particular, FIG. 2 shows a NMP 102 including a processing entity 103 as defined above for performing one or more application transactions. The processing entity 103 in turn includes an application transaction manager 110 (ATM) according to the present invention. The ATM 110 according to the present invention is linked to an undo log as will be seen which is described below in connection with FIG. 5. The undo log is stored for example in a selected database (DB), e.g., DB 105. The data in the undo log permits the parts of an incomplete or failed application transaction to be undone. For example, a failed AT which has been processed is undone by rolling back to the original values of transaction affected target objects, e.g., 104–114, for example. The ATM 110 controls the loading of the undo log and its disbursement in roll-back operation of data to restore the preceding target object values. NMP 102 is a server or computer tasked with network management tasks and functions according to a predetermined network arrangement.

Figure 3A:
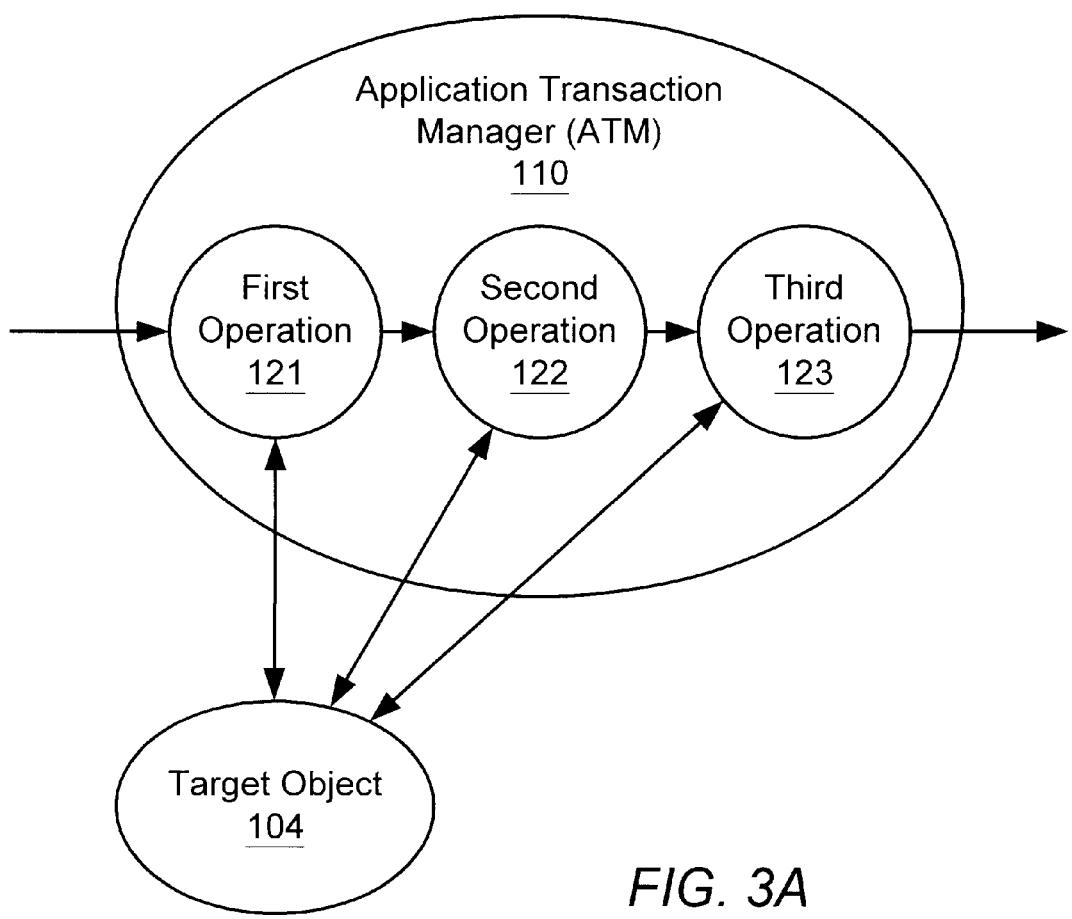
FIG. 3A is a diagram of an application transaction manager according to the present invention.

FIG. 3A is a diagram of an application transaction manager (ATM) 110 according to the present invention. In particular, FIG. 3A shows the ATM 110 linking or threading a series of first through third operations, respectively 121 through 123, which have been linked together as a composite application transaction to operate upon one or more target objects represented collectively by target object 104. Target object 104 can be resident or invoked on the same competing platform (i.e. computer system) as the ATM 110 or on a separate platform or system, as configured or selected by the user or a surrogate for example.

Figure 3B:
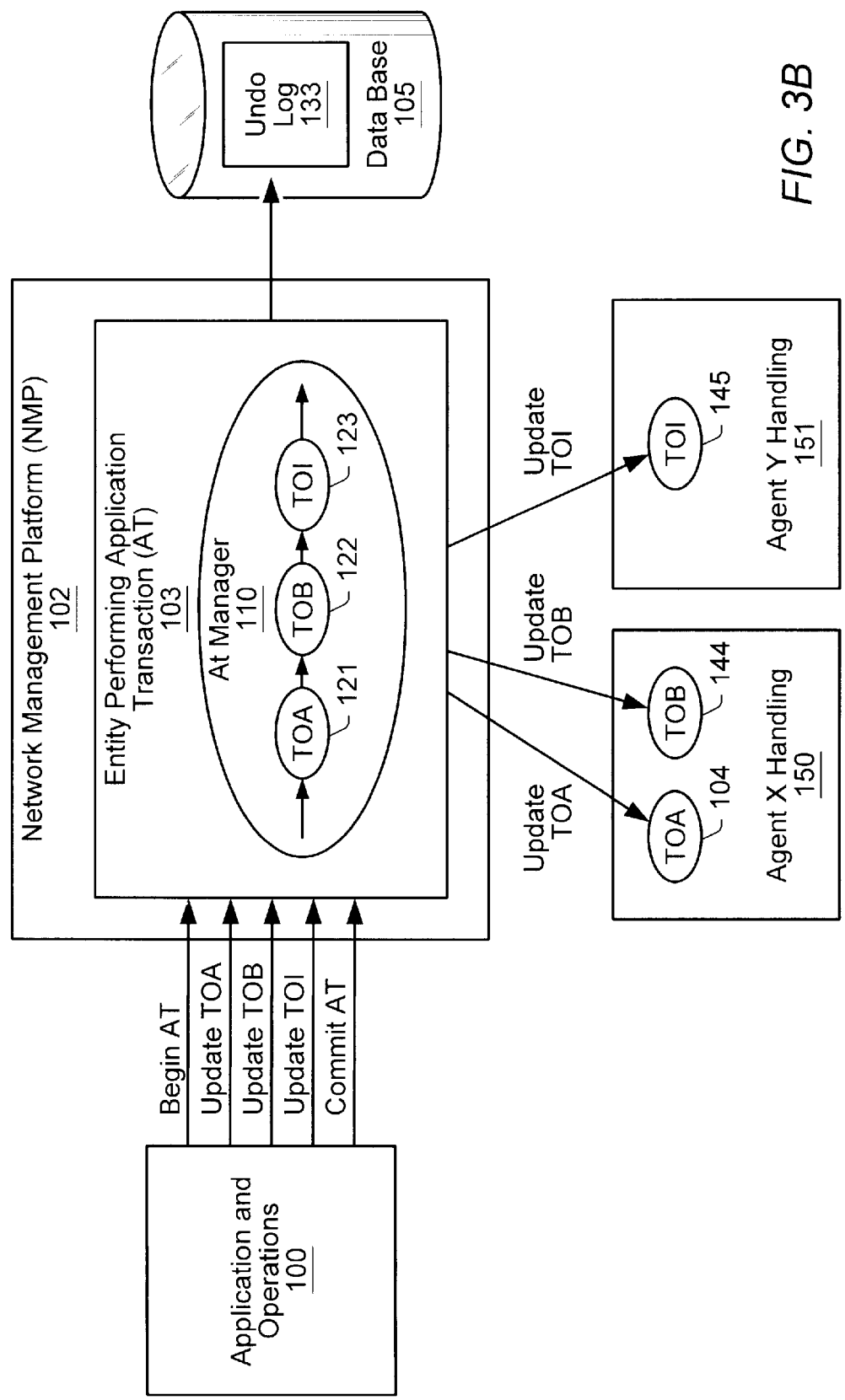
FIG. 3B is a diagram showing how an application transaction manager provides transactional semantics according to the present invention around particular target objects (e.g., TOA, TOB, TOI) that reside in different agents (for example, target objects TOA and TOB reside in Agent X; and target object TOI resides in Agent Y) irrespective of whether the particular agents themselves support the particular transactions.

FIG. 3B is a diagram showing how the ATM 110 provides transactional semantics around the target objects (TOA, TOB, TOI) that live in different agents such as agents X and Y, respectively 150 and 151. The target objects TOA and TOB live in Agent X; TOI lives in Agent Y, irrespective of whether the agents 150, 151 themselves support particular transactions. Network management transaction operations are referred to herein as "Application Transactions" or "AT", as they invoke one or more network management applications such as the application and operations 100 referred to in FIG. 3B. An application transaction performing entity 103 in a service provider or agent 150, 151 handles the processing of AT transactions. This entity 103 includes the "Application Transactions Manager" or "AT Manager" 110 and is implemented as an independent computing process to provide AT transaction services to the management entities which need it. However, the general applicability of this invention is not limited to only the above practice. According to one embodiment of the present invention, the user builds a "begin AT" message to AT performing entity 103 and sends this message to AT performing entity 103 and to the service provider or agents X and Y. Upon receiving this message, the service provider communicates the request to the AT Manager 110 to create a binding to link all subsequent management operations together. This activity happens according to one embodiment of the present invention without any user knowledge. The user then continues to build and send all other management operations to the service provider which then directs them to the AT Manager 110 entity 103. This process continues until the AT Manager 110 receives a "commit AT" message or an "abort AT" message. In the event that a "commit AT" is received, the service provider works in conjunction with the AT Manager 110 to cause a synchronous commit of all operations included in this transaction. If an "abort AT" message is received, the binding AT and the member operations will be aborted or rolled back completely in a way similar to an "Undo" of the operations that have been carried out prior to the abort request. All operations are either committed altogether as a single transaction or aborted altogether if an operation fails or if the above directive is received.

Figure 4:
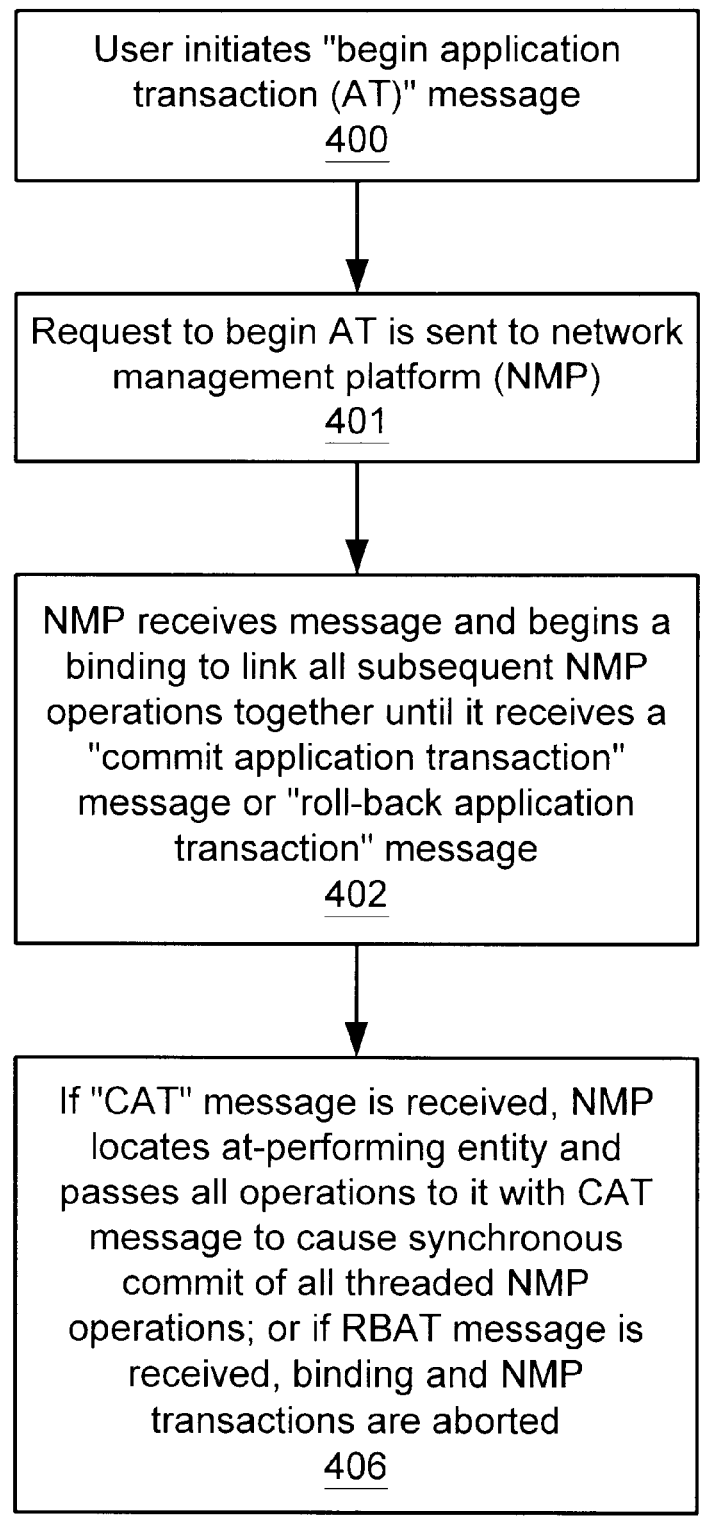
FIG. 4 is a flowchart of a method according to the present invention in which a user implements a selected application transaction.

FIG. 4 is a flowchart of a method according to the present invention in which a user implements a selected application transaction. In particular, FIG. 4 shows a user building 400 a begin application transaction message. Next, the request to begin an application transaction is sent 401 to a network management platform (NMP). Thereafter, the network management platform receives 402 the message and begins a binding process to link all subsequent operations together until the NMP receives a commit application transaction message or a rollback application transaction message. Then, if a commit application transaction message is received, the NMP locates 406 an application transaction performing entity and passes all operations to it with a commit application transaction message to cause synchronous commit of all threaded operations. Alternatively, if a rollback application transaction message is received, the binding or threading of operations and transactions is aborted.

Figure 5:
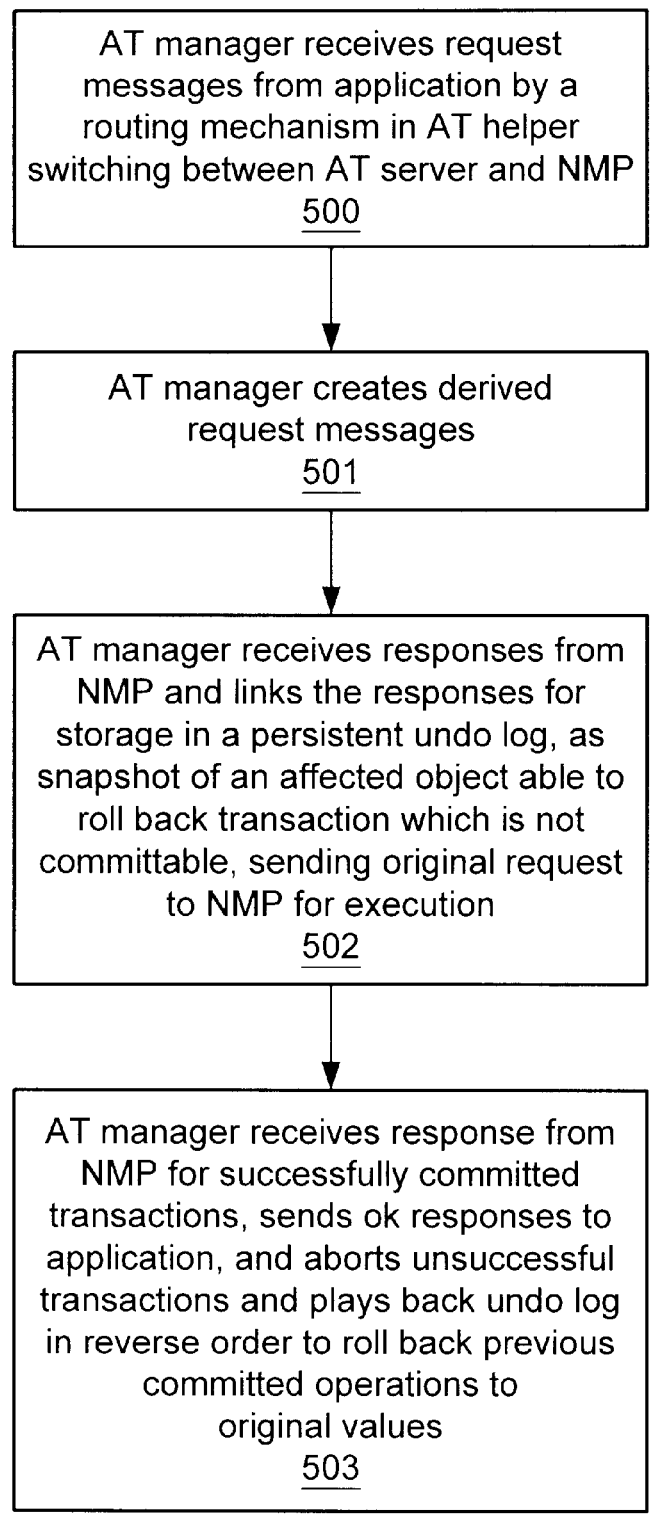
FIG. 5 is a flowchart of a method according to the present invention in which an application transaction manager receives request messages from an application.
Figure 7:
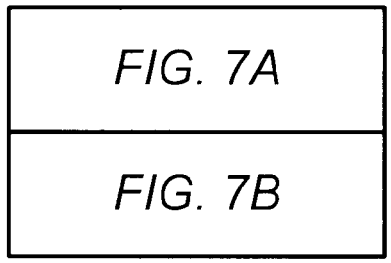
FIGS. 7A–7B are collectively a diagram of how an undo log is used in the event the transaction is aborted.
Figure 8:
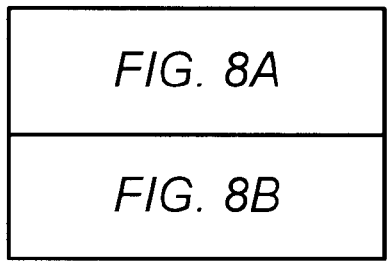
FIGS. 8A–8B are collectively a diagram of how an undo log is built for an application transaction for a typical network management application to manage objects conforming to RFC 1157 SNMP protocols.

FIG. 5 is a flowchart of a method according to the present invention in which an application transaction manager (ATM) receives request messages from an application. In particular, FIG. 5 shows an application transaction manager receiving 500 request messages from an application through a routing mechanism in an application transaction helper device between an application transaction server and a network management platform with respect to particular operations needing to be performed. The application transaction manager (ATM) according to the present invention creates 501 derived messages from the request messages. The application transaction manager (ATM) further receives 502 responses from the network management platform (NMP) and links the responses for storage in a persistent undo log, as a snapshot of an affected object(s) which is(are) thereupon able to roll back particular transactions which are not committable in terms of resetting target objects to the values held before transaction processing had begun, and sending back the original request to the network management platform (NMP) for execution. The application transaction manager (ATM) 503 next receives OK and non-OK responses from the network management platform as to whether each individual derived operation has been successfully atomically accomplished in its entirety. The ATM then sends OK responses to allow application processing, and aborts non-OK transactions and plays back the associated undo log in reverse order to roll back previous committed operations to reestablish original object values in the target objects.

Figure 6:
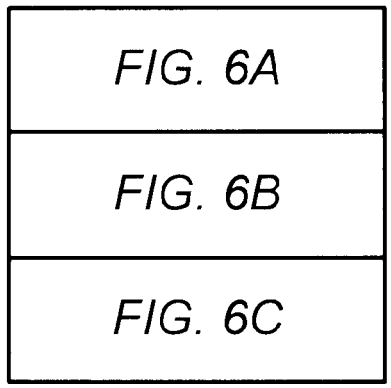
FIGS. 6A–6C are collectively a diagram of how an undo log is built for an application transaction for a typical network management application to manage objects conforming to the X.711 CMIP protocols.
Figure 6A:
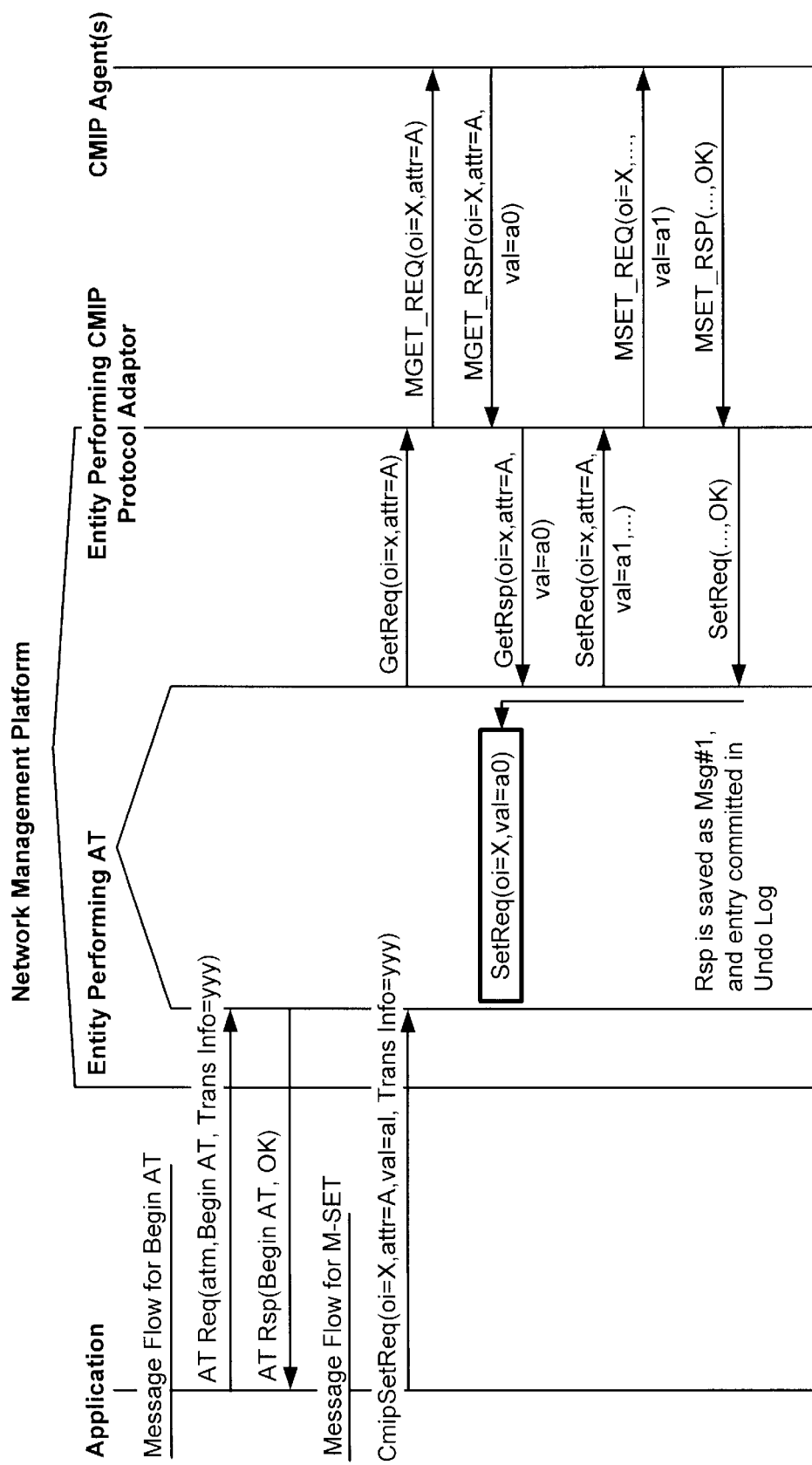
Figure 6B:
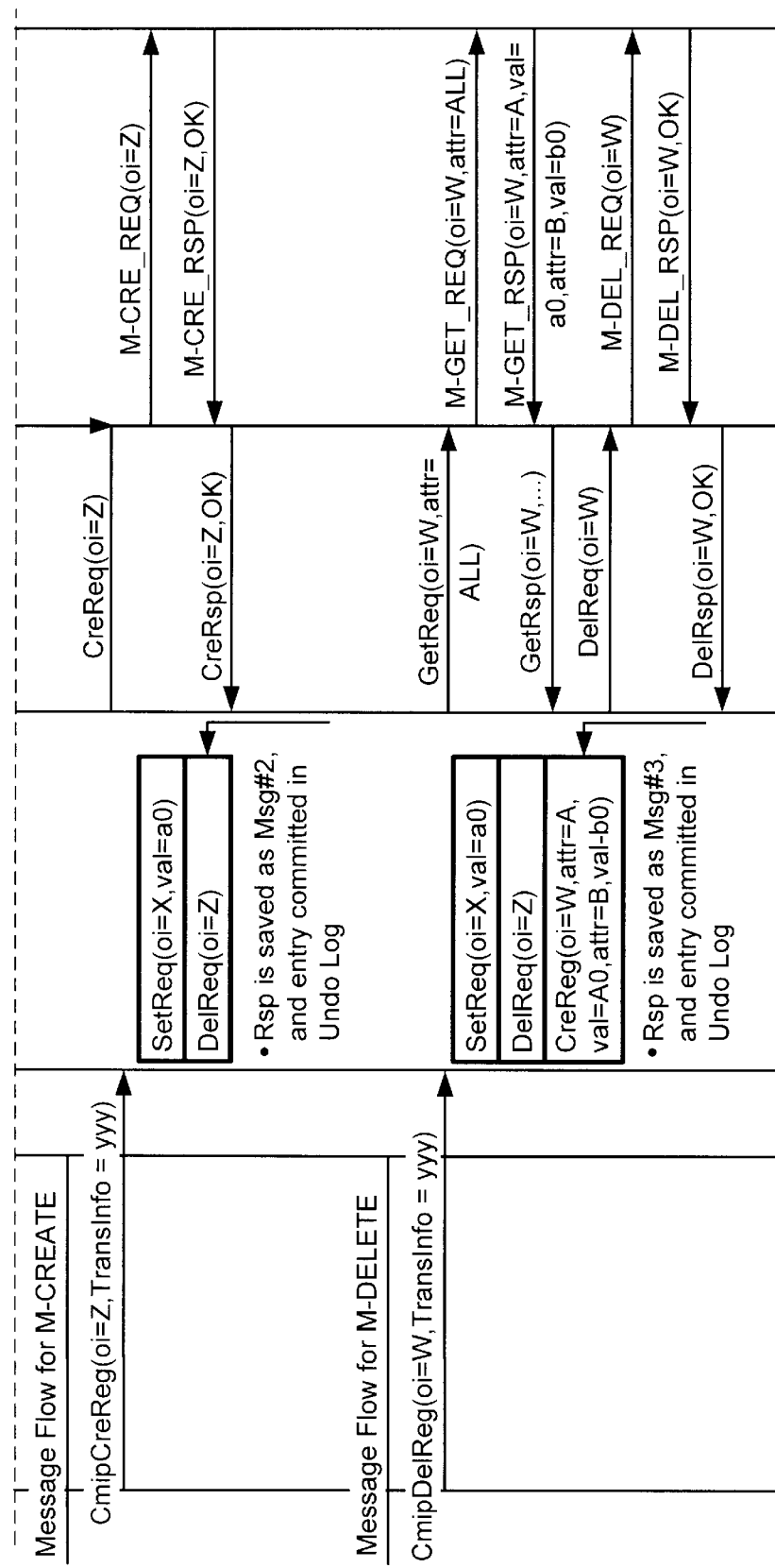
Figure 6C:
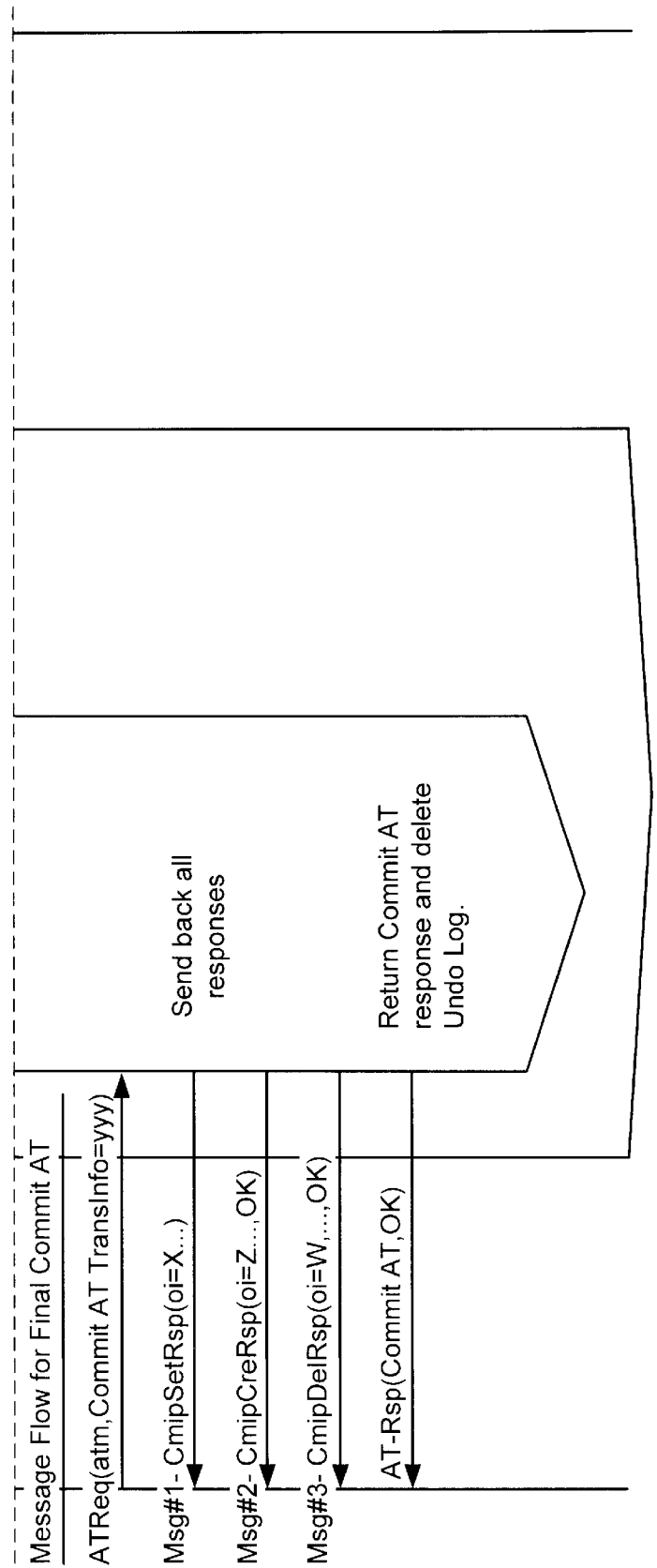

FIGS. 6A–6C are a diagram of how an UNDO log is built for an AT application that manages objects that conform to the behaviours which are specified in X.711 for CMIP protocols. In the part of Message Flow For M-SET, a set request to a target object X is sent to the network management platform (NMP) 102 by the application. This is done at the programming interface via a function, CmipSetReq, which abstracts the CMIP M-SET protocol data unit (PDU). At the NMP 132, the AT performing entity buffers the request, issues a number of M-GET messages to the target object X first in order to build an undo record for the M-SET request in the event the transaction is aborted. The undo record is basically another M-SET request to the same target object, but with original values. It will allow resetting the modified target object to the original values that predate the currently requested modification. After the undo record is built, the NMP forwards the M-SET request to the target object. If the M-SET request is successful, the AT performing entity saves its corresponding undo record in the undo log, and then proceeds to the next request in the transaction. Otherwise, it removes the current undo record, and aborts the particular transaction by executing the undo log in reverse order. FIGS. 6A–6C further show an example of how an M-CREATE request is handled by the NMP 102. This relates to Message Flow for M-CREATE. The particular application entity issues the function CmipCreReq to abstract a CMIP M-CREATE protocol data unit (PDU). In particular, an undo record is built for each M-CREATE request. It is substantially an M-DELETE request to remove or "undo" a prior M-CREATE request in the case of transaction abort. Finally, an example of how an M-DELETE request is handled is shown in the part of Message Flow for M-DELETE. In this case, the application entity issues the function CmipDelReq that abstracts the CMIP M-DELETE protocol data unit (PDU) to the NMP. Next, the AT performing entity in the NMP issues a number of GET requests to the target object, gets the responses, and builds them into an undo record of the M-DELETE request. The undo record is for example an M-CREATE request to re-create the exact same target object, with the same or a similar set of attribute values that it had prior to the delete.

Figure 7A:
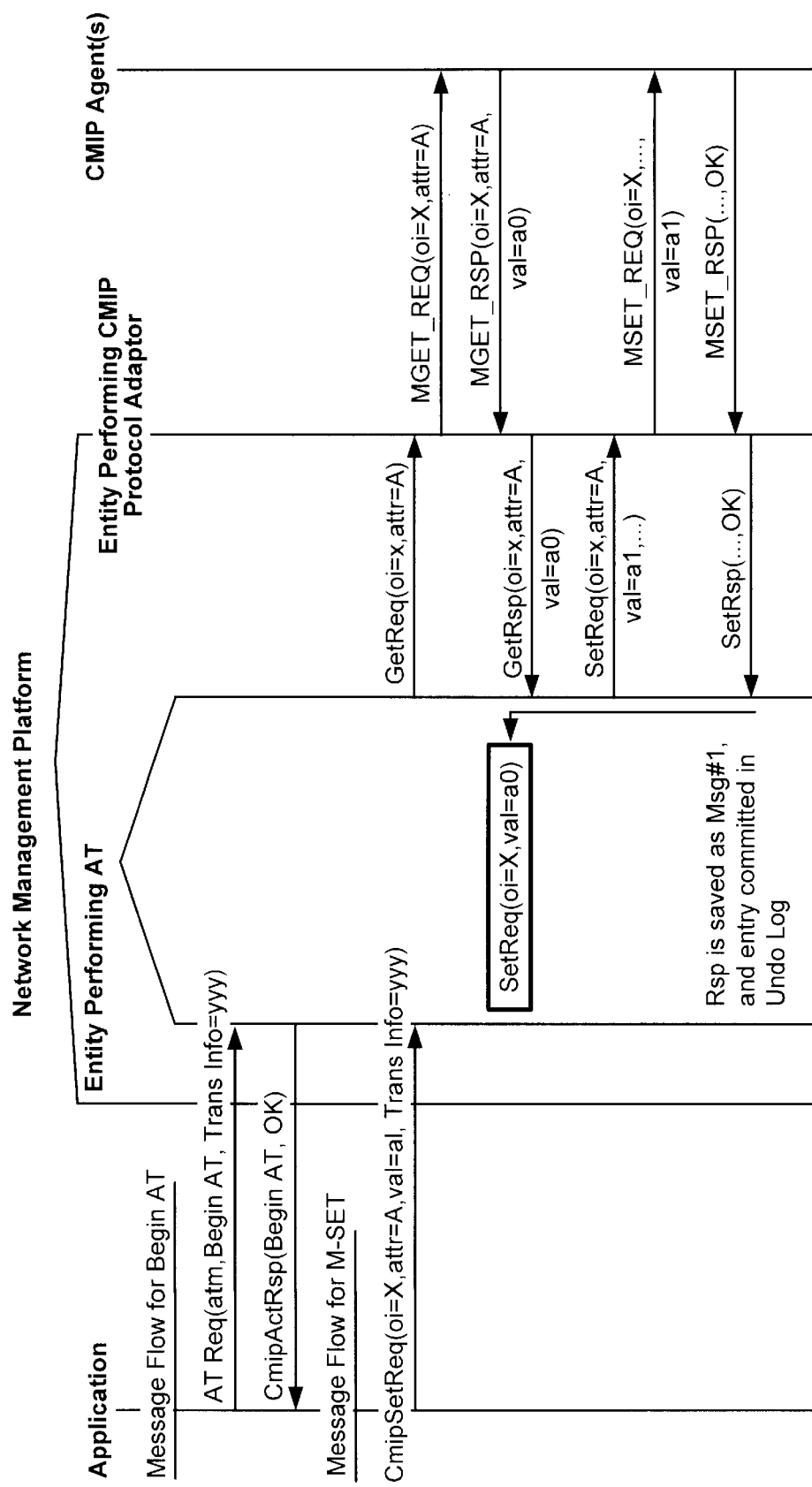
Figure 7B:
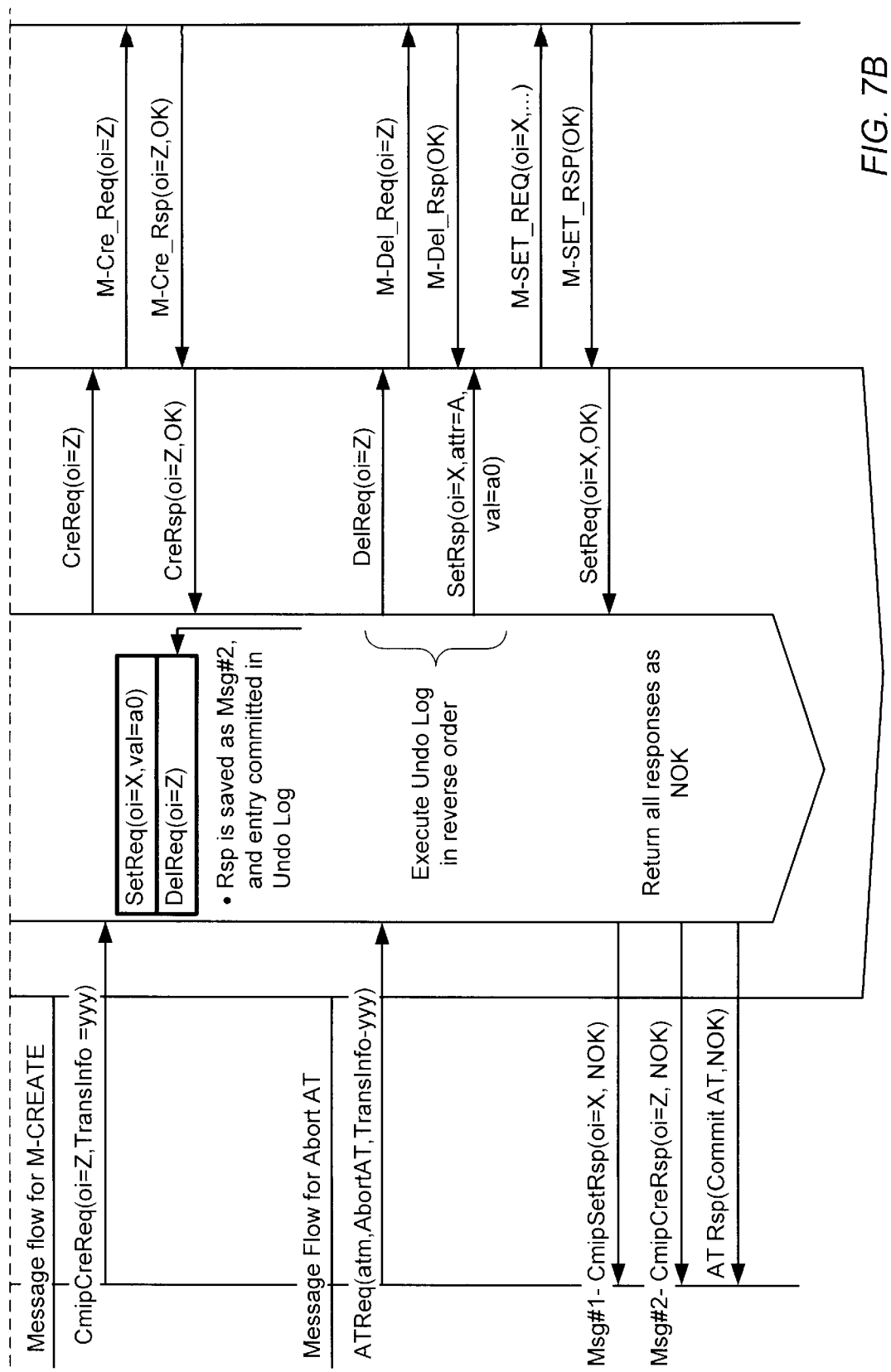

FIGS. 7A–7B are a diagram of how the undo log is used to abort a particular transaction. Moreover, the undo log is executed in reverse order, and the responses are all returned as not OK, and an abort response is returned. It should be noted that the steps for processing an "ABORT message" are executed according to one embodiment of the present invention when either (i) an explicit ABORT request is received from the application or (ii) an internal ABORT condition is recognized by the AT server, due to the failure of any preceding M-SET, M-CREATE or M-DELETE requests processed by that server within the same transaction. It should also be noted that according to one embodiment of the present invention there is no rollback for CMIP M-GET, CMIP M-CANCEL-GET, CMIP M-ACTION, or SNMP GET requests. These requests are passed through transparently by the AT server and no entry is created in the undo log for processing these requests according to one embodiment of the present invention.

Figure 8A:
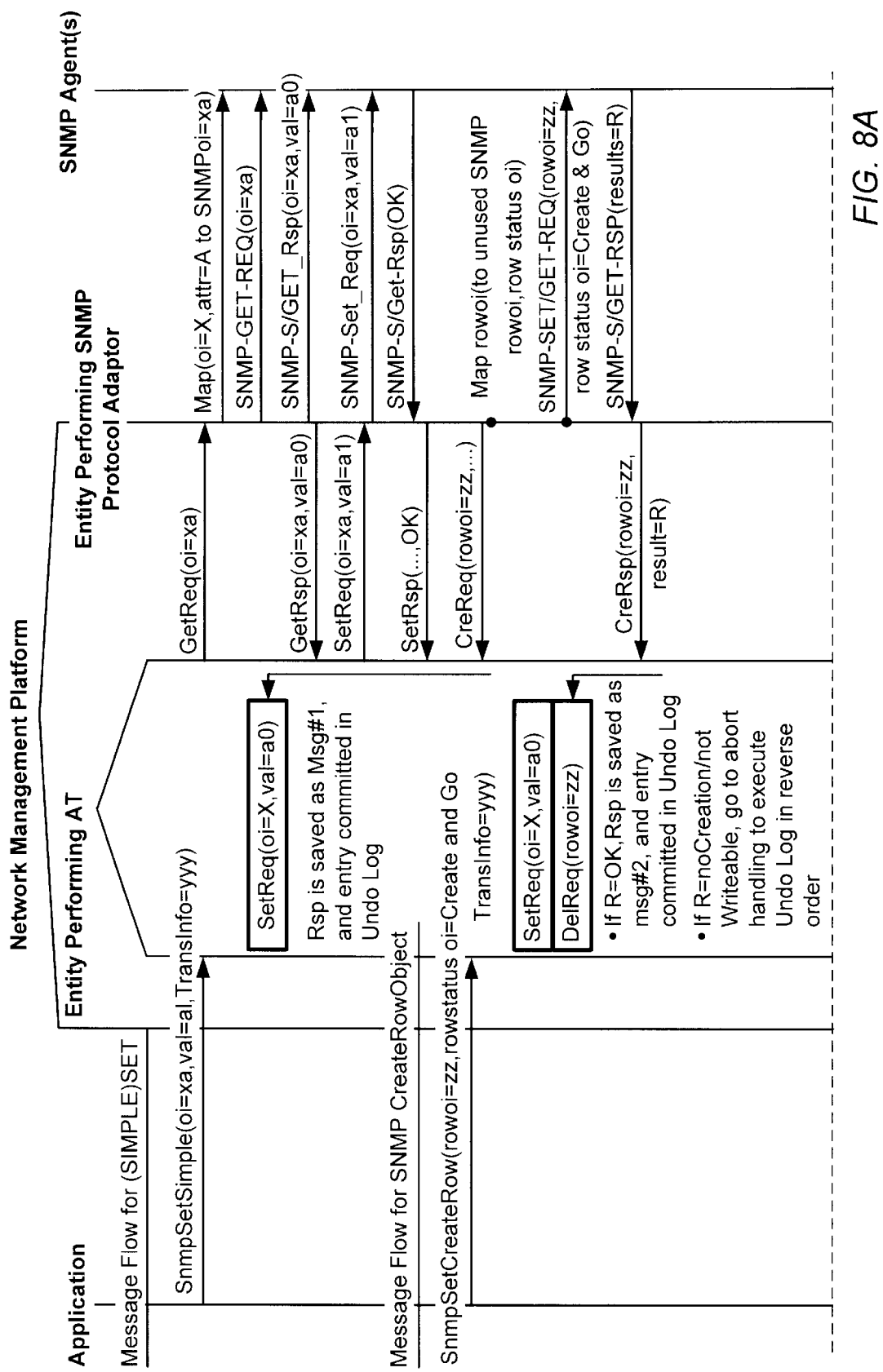
Figure 8B:
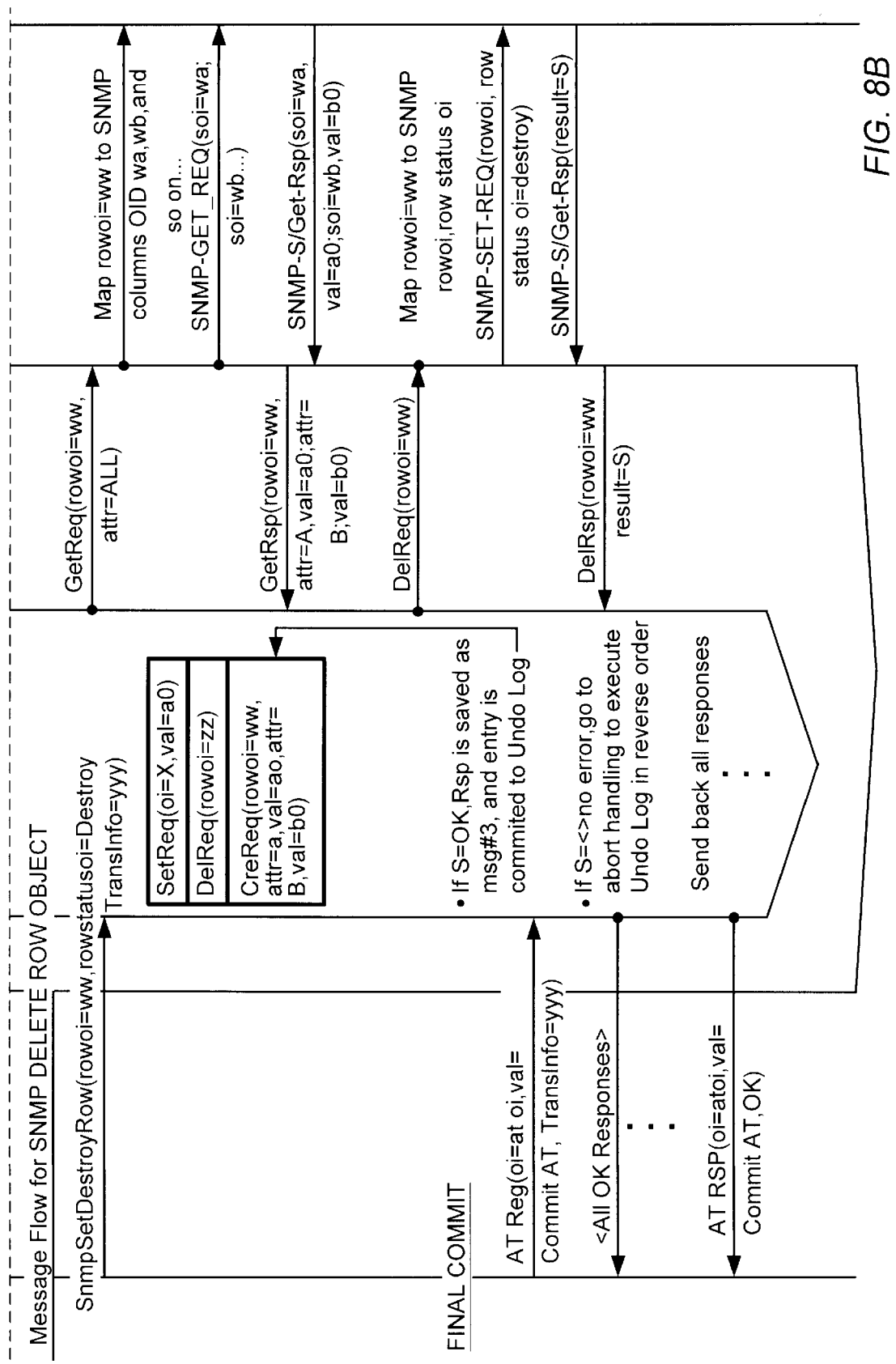

FIGS. 8A–8B are a diagram of how an UNDO log is built for an AT application that manages objects that conform to predetermined behaviours and SNMP protocols. In the Message Flow portion of the SNMP-SET, the application entity issues a programming function SnmpSetSimple request to the NMP 102. This function abstracts the SNMP-SET protocol data unit (PDU). At the NMP 102, the AT performing entity will issue a number of SNMP-GET requests to the target object, get the responses, and build them into an undo record. Subsequently, the AT performing entity builds and forwards the actual SNMP-SET PDU to the target object. If the request is successful, it saves its corresponding undo record in an undo log, and then proceeds to the next request in the transaction. Otherwise, it removes the current undo record, and aborts the transaction by executing the undo log in reverse order. Next, the message flow for SNMP-CREATE-ROW-OBJECT in the application entity issues a function named SnmpSetCreateRow to abstract the SNMP-SET protocol data unit (PDU) which is used to create a whole row object. In this case, an undo record is created for the above request. It is particularly a DelReq that is mappable to an SNMP-SET PDU that can delete the said whole row object, so that the reversion of the create operation can be performed, if the particular transaction is aborted. Finally, in the final portion of the drawing, under the heading Message Flow for SNMP-DELETE-ROW-OBJECT, the application entity issues the programming function SnmpSetDestroyRow. This function is used to delete a whole row object. Accordingly, a number of SNMP-GET requests are issued to the target object to retrieve all column values of the row object. These values are used to build a CreReq that is mappable to an SNMP-SET PDU that can in turn re-create the whole row object, so that the reverse of the delete operation can be performed in case of transaction abort.

Appendix A

An AT server may have multiple transaction running concurrently at the same time. In order to identify the particular transaction to which a message belongs, particular token information is passed along with user message to uniquely identify the transaction. This information is known as the transaction token information. There are three representations of this token according to particular embodiments of the present invention:

One token representation according to the present invention requires full transaction information. In particular, the token contains information to uniquely identify a transaction globally for creating a new transaction or for relating to an existing transaction.

Another token representation according to the present invention requires a global transaction identifier. In particular, a derived identifier is provided which is mappable to full transaction information. The global transaction identifier may be used in place of full transaction information for repetitive references of the same transaction in request/response messages. This identifier is globally unique and is globally translatable to/from the full transaction information through well-known entities such as NMP's that either provide access to the global transaction mapping function or supply this function themselves.

Another token representation according to the present invention requires a transaction identifier. In particular, a derived identifier is used to identify a transaction that is locally unique within the domain of an AT manager.

According to the present invention, the transaction token information is expressed according to the following ASN.1 syntax:

```
CHOICE {
    transInfo            [1] TransactionInfo,
    globalTransId        [2] Integer,
    localTransId         [3] Integer
}
TransactionInfo ::= SEQUENCE {
    userName             GraphicString,
    applicationId        INTEGER (0...MAX),
    misId                AET,
    threadId             [0] INTEGER OPTIONAL,
    enclosingTransaction [1] TransactionInfo OPTIONAL
```

According to one embodiment of the present invention, the selected transaction information is passed in a BeginAT context message. The AT server chooses to return either a local transaction identifier or a global transaction identifier that the application may use subsequently to communicate with the AT server.

Appendix B

Specification of Application Transaction API "AppTrans" —AT Helper Object

AppTrans is a C++ object class which supports Application Transactions (ATs). A constructor of AppTrans associates a selected AppTrans variable to a particular Platform variable as follows:

AppTrans (Platform& <plat>=Platform::def_platform);

In order to support a asynchronous-only mode of AT in the EM, the following methods are implemented according to one embodiment of the present invention:
Begin AT method (synchronous version)
Commit AT method (synchronous version only)
Abort AT method (synchronous version only)
Get Result method
Get Result String method
The following methods fall within the scope of the present invention:
Begin Application Transaction

```
Result AppTrans::begin_trans(
    CDU <atm_name>):        // AT Manager name
```

This method specifies a beginning bound for a new transaction. All messages following this message are bound in this transaction until a message denoting an end transaction or abort transaction is sent. This method runs in synchronous mode and returns the processing result of the beginning transaction request. If a result is NOT_OK, a caller can invoke according to the present invention get_result( ) or a get_result_string( ) method to receive an even more detailed error according to the present invention.
End Application Transaction
    Result AppTrans::commit_trans( );
    This method according to the present invention signifies the ending of the currently active transaction and requests the commit processing of the transaction. This method runs in synchronous mode and returns the final result of the end transaction request processing. If the method is returned as NOT_OK, the Caller can invoke get_result ( ) or get_result_string methods to get a more detailed error. Otherwise, the status of the currently active transaction is changed to AT_SUCCESS.
Abort Application Transaction
    Result AppTrans::abort_trans( );
    This method according to the present invention requests the start of abort processing for the currently active transaction. This method runs in a synchronous mode and returns the final result of abort transaction request processing. If the method is returned as NOT_OK, the Caller can invoke get_result ( ) or get_result_string ( ) methods to get a more detailed error. Otherwise, the status of the currently active transaction is changed to AT_ABORTED.
Get Application Transaction Result and Error String
    AT_Result AppTrans::get_result( )
    char*AppTrans::get_result_string(void)
    These functions return the status of the currently active transaction and the status string associated with this transaction. The status types and the strings are shown in the below table.

| Result Type | Result String |
|---|---|
| AT_INIT | Initialized |
| AT_SUCCESS | Successful |

-continued

| Result Type | Result String |
|---|---|
| AT_ABORTED | Aborted |
| AT_PENDING | Pending for End or Abort request |
| AT_BEGIN_REQ_ERROR | Failed on Begin request |
| AT_END_REQ_ERROR | Failed on End request; transaction aborted |
| AT_ABORT_REQ_ERROR | Failed on Abort request; transaction aborted |
| AT_COMMIT_ERROR | Failed to be committed |

A typical sequence of network management operations according to one embodiment of the present invention is as follows:

DELETE router1;
DELETE router2;
DELETE circuit1;
SET alarm.status="historical" WHERE alarm.originator= router1;
SET alarm.status="historical" WHERE alarm.originator= router2;

The constraints on such an embodiment are as follows:

1. If the DELETE of either router1 or router2 succeeds, then the DELETE of circuit1 MUST succeed, otherwise a "dangling circuit" will result.
2. If the DELETE of either router fails, then the DELETE of the other router and of the circuit cannot be allowed to proceed, since otherwise the network will be in an inconsistent state (i.e., misconfigured topology).
3. If the DELETE of any router succeeds, then the SET of its alarm status to "historical" MUST succeed, otherwise there will be inconsistent alarms in the system (i.e., alarms will be active when the device that they came from no longer exists).
4. If the DELETE of any router fails, then the SET of its alarm status to "historical" cannot be allowed to proceed, since it is not desired to archive any alarms whose originating device is still active in the network and needs fixing.

When router1 and router2 are controlled by different network management agents, one agent may be up while the other is down. Accordingly, the delete of one router may succeed and the other one may fail.

According to the present invention, the following request can accordingly be implemented atomically:

```
BEGIN TRANSACTION;
    DELETE router1;
    DELETE router2;
    DELETE circuit1;
    SET alarm.status = "historical" WHERE alarm.originator = router1;
    SET alarm.status = "historical" WHERE alarm.originator = router2;
COMMIT TRANSACTION;
``` and atomic execution of the transaction is ensured under the present invention. Following is an example of Application Transaction.

```
#include <pmi/app_trans.hh>
main (int argc,
    char **argv)
{
    Platform plat (duEM);
    // Set up connection to the MIS.//
    plat = Platform(duEM);
    if (plat.get_error_type( ) != PMI_SUCCESS) {
        cout << plat.get_error_string( ) << endl;
    }
    // Prepare locally all images before transacting on the//
    // Boot router1, router2, circuit1 images at application side
    Image router1 = Image (router1_dn, router1_class);
    if (!router1.boot( )) {
        exit (1);
    }
    Image router2 = Image (router2_dn, router2_class)l;
    if (!router2.boot( )) {
        exit (1);
    }
    Image circuit1 = Image(circuit1_dn, circuit1_class);
    if (!circuit1.boot( )) {
        exit (1);
    }
    // Boot all alarms WHERE originators are either router1 or router2
    Album the_alarms = Album("The_Alarms");
    Timeout to;
    the_alarms.set.derivation
    ("/systemId=\"sys\"/log=\"AlarmLog\"
        /LV (1)
        /CMISFilter (or: {item:equality: (routerid, \"router1\"},
                        {item:equality: {routerId, \"router2[|]P'))
    ");
    if (!the_alarms.all_boott(to)) {//Boot failed?
        cout <<"Using all_boot( ) : Boot images failed";
        exit (2);
    }
    // Build and invoke Application Transaction requests//
    AppTrans at(plat);
    // Sync.begin Application Transaction
    if (!at.begin_trans(/systemId =\"sys\"/subsystemId=\"aux\"")) {
        cout << "AT Begin Transaction Failed! Reason ="
                << at.get_error_string( ) <<endl;
        exit (7);
    }
    // Async. destroy router1, router2, circuit1
    if(!router1.start_destroy( ) {
        cout << "Failed to destroy router1. "
                << router1.get_error_string( ) <<endl;
        exit (7);
    }
    if(!router2.start_destroy( ) {
        cout << "Failed to destroy router2. ";
                << router2.get_error_string( ) <<endl;
        exit(7);
    }
    if(!circuit1.start_destroy( ) {
        cout << "Failed to destroy circuit1. ";
                << circuit1.get error_string( ) <<endl;
        exit (7);
    }
    // Async. set all alarms to "historical".
    if (!the_alarms.all_set("status", "historical") {
        cout << "Set Failed! Reason = "
                << the_alarms.get_error_string( ) <<endl;
        exit (7);
    }
    if (!the alarms.all_start_stere( ) {
        cout << "Store Failed! Reason = "
                << the_alarms.get_error_string( ) <<endl;
        exit (7);
    }
}
```

-continued

```
// Sync. commit Application Transaction
AT_Result result = at.commit_trans( );
// Check result of transaction//
if (result != AT_SUCCESS) {
    cout << "AT End Transaction Failed! Reason = "
        << at.get_result_string( ) <<end1;
    exit (7);
}
exit (0);
}
```

Appendix C

According to one embodiment of the present invention, the primitives of OSI Transaction Processing Service for Network Management are used to execute the dialogue between the network management application and the Application server.

The use of the OSI Transaction Processing service for TMN Network Management is supported in the following international standard:

ITU Recommendation X.702: Information Technology—Open Systems Interconnection—Application Context for Systems Management with Transaction Processing [also ISO/IEC 11587].

The OSI Transaction Processing service itself is supported in the following international standards:

ITU Recommendation X.860: Open Systems Interconnection—Distributed Transaction Processing: Model ITU Recommendation X.861: Open Systems Interconnection—Distribution Transaction Processing: Service Definition ITU Recommendation X.862: Open Systems Interconnection—Distributed Transaction Processing: Protocol specification A related international standard dealing with Commitment, Concurrency and Recovery is:

ITU Recommendation X.851: Information Technology—Open Systems Interconnection—Service Definition for the Commitment, Concurrency and Recovery Service Element [also ISO/IEC IS 9804].

Note that while all the above standards specify the message set that must be exchanged between an application and a Transaction Processing Service Provider (TPSP, which in this embodiment is the Application Transaction server) in order to execute transactional semantics, none of the above standards suggest or specify any mechanism by which the TPSP can internally guarantee atomicity for the transaction by capturing the bound data of the transaction in a consistent state. It is this mechanism, described in this patent application, that constitutes the one of the claims of this invention.

The embodiment being described here merely describes how this mechanism in the Application Transaction server may be exercised by an external application using the network management transaction processing message set, as defined in the mappings specified by the X.702 standard of the X.711 CMIP TMN management protocols to X.860/X.861/X.862 Transaction Processing services.

In an X.702-compliant embodiment of this invention, both the network management application and the Application Transaction Server are X.860/X.861/X.862-compliant Transaction Processing Service user Invocations (TPSUIs). This means that all CMISE, SMASE, and ROSE PDUs exchanged between them are wrapped within the TP-DATA primitive as defined by the X.861 TP service.

Note that it is possible to have an X.702-compliant TP server that is also capable of servicing non-X.702 transactions, e.g., an X.702 -compliant embodiment of this invention may co-exist in the same physical computer system and same software process as the other (non-X.702-compliant) embodiments of this invention described earlier. This is possible if the non-X.702-based network management transactions are executed over an association which is not in the pool of TP associations managed by the X.860/X.861/X.862-based TPSP.

In this embodiment, both the network management application and the Application Transaction server, being TPSUIs, have a TSPU-Title. Since the application does not necessarily need to know whether the network management platform has a separate Application Transaction server process for servicing transactions, the TPSU-Title of the Application Transaction server is considered to be the TPSU-Title of the entire network management platform, i.e., the platform as a whole is considered a TP server. However, messages directed to this TPSU-Title are routed directly to the Application Transaction server.

When an application starts a transaction delimited by a Begin-Transaction primitive, the API library (PMI) checks to see if an ACSE application-association has been established with the X.702-compliant Application Transaction server; if not, it establishes such an association. Next, it checks to see whether a TP dialogue has been established with the X.702-compliant Application Transaction server; if not, it issues a TP-BEGIN-DIALOGUE with the Application sever. Finally, it issues a TP-BEGIN-TRANSACTION to delimit the beginning of the transaction.

When a TP dialogue is established between the network management application and the X.702-compliant Application Transaction server, the following functional units are selected as part of the TP dialogue.

A coordination level of "commitment" is selected for the dialogue, thereby relieving the network management—application from coordinating the commitment of the bound data itself;

A Commit Functional Unit and an Unchained Transactions Functional Unit are selected;

The Handshake Functional Unit may or may not be selected.

In this embodiment, procedure calls invoked by the application to delimit a transaction, as well as the network management operations invoked by the application, are sent to the X.702-compliant Application Transaction server using the following mappings to X.860/X.861/X.862 TP service primitives, as specified by the X.702 standard:

| | |
|---|---|
| Begin Transaction | A-ASSOCIATE (if necessary) |
| | TP-BEGIN-DIALOGUE (if necessary) |
| | TP-BEGIN-TRANSACTION |
| M-CREATE | TP-DATA wrapping CMISE/ROSE M-CREATE PDU |
| M-DELETE | TP-DATA wrapping CMISE/ROSE M-DELETE PDU |
| M-CANCEL-GET | TP-DATA wrapping CMISE/ROSE M-CANCEL-GET PDU |

-continued

| | |
|---|---|
| M-GET | TP-DATA wrapping CMISE/ROSE M-GET PDU |
| M-SET | TP-DATA wrapping CMISE/ROSE M-SET PDU |
| Commit Transaction | TP-COMMIT |
| Abort Transaction | TP-ROLLBACK |
| END TRANSACTION | TP-COMMIT (if no prior issuance of TP-COMMIT) TP-END-TRANSACTION |

If the Handshake Functional Unit has been selected, the primitive TP-HANDSHAKE issued by the network management application is considered to be the equivalent of the TP-COMMIT primitive.

According to one embodiment of the present invention, the X.702-compliant Application Transaction server issues a TP-COMMIT-COMPLETE primitive to the network management application when any TP-COMMIT indication has been successfully and completely serviced. It further issues a TP-ROLLBACK-COMPLETE primitive to the network management application when a TP-ROLLBACK indication has been successfully and completely serviced.

According to one embodiment of the present invention, an X.702-compliant Application Transaction server uses these message sets as external communication mechanisms to interact with the outside world (network management applications). It further continues to use the undo log mechanism to ensure that transactions that it is executing capture adequate data about the transaction's initial state so that it is capable of being rolled back if required.

What is claimed is:

1. A computer implemented method of managing network management transactions requested by a particular application and directed toward at least a single predetermined target object, in a computer system including an application transaction server and a network management platform, comprising:

receiving a plurality of network management requests for affecting at least a single object having particular initial object values, wherein the plurality of network management requests are received from a plurality of sources;

building a network management transaction combining the plurality of network management requests which have been received, wherein the network management transaction comprises an atomic unit such that the plurality of network management requests commits or fails in unison; and storing current object values of each targeted object to enable resetting of object values to initial settings if network management transaction processing fails.

2. The computer implemented method according to claim 1 further comprising determining the location of network management transaction processing.

3. The computer implemented method according to claim 1 wherein network management transaction processing is conducted at a selected network management platform.

4. The computer implemented method according to claim 1 wherein network management transaction processing is conducted at a selected application transaction server.

5. The computer implemented method according to claim 1 wherein storing is accomplished at a selected database.

6. A computer program product embodied in a computer usable medium having a computer readable code means embodied therein for managing network management transactions, the computer program product comprising:

a first computer readable code construct (CRCC) configured to receive a plurality of network management request messages from a plurality of sources, wherein the network management request messages specify desired network management operations with respect to at least a single target object;

a second CRCC configured for combining the plurality of network management requests into a single network management transaction, wherein the network management transaction comprises an atomic unit such that the plurality of network management requests commits or fails in unison; and a third CRCC configured to determining whether to perform the network management transaction locally or whether to select a particular application transaction server to perform the constructed network management transaction.

7. A computer system comprising:

an application transaction server (ATS) configured to operate an application transaction manager in response to receipt of network management transactions from a plurality of sources, wherein the network management transactions comprise atomic units of network management requests that commit or fail in unison; and a database coupled to the ATS for storing an undo log to enable reversal of network management transactions performed by said application transaction server.

8. The computer system according to claim 7 further comprising:

a data processing system configured with a routing mechanism to selectively distribute particular network management requests for processing at selected servers.

9. A computer implemented method of network management, comprising:

combining a plurality of network management request messages from a plurality of sources for performance of corresponding network management operations into a combined network management transaction, wherein the transaction comprises an atomic unit such that the network management operations are either performed or not performed in unison; and executing the combined network management transaction, wherein said executing comprises attempting to perform each of the network management operations.

10. The computer implemented method according to claim 9 including individually executing predetermined network management operations upon a selected object having predetermined initial values.

11. The computer implemented method according to claim 10 including recording the initial values of the selected object.

12. The computer implemented method according to claim 11 wherein a record of initial values is stored in a selected database.

13. The computer implemented method according to claim 9 wherein only a portion of the network management operations combined in a network management transaction are capable of completion.

14. The computer implemented method according to claim 13 including resetting transaction modified object values to initial states in response to a failure to execute the entire network management transaction atomically.

15. The computer implemented method according to claim 14 including provisioning of transaction semantics for selected objects irrespective of whether their agents have or do not have a particular transactional capability.

16. The computer implemented method according to claim 15 including provisioning a transaction service for selected objects through their agents wherein this service is transparent of the location of the agents.

17. The computer implemented method according to claim 16 including mapping of AT messages and AT operations by an AT server to those messages and operations specified in the OSI Transaction Protocols as documented in X.702/X.860/X.861/X.862 protocols for objects exhibiting and conforming to the behaviours specified by any selected one of said protocols.

18. The computer implemented method according to claim 17 including mapping of AT messages and AT operations by the AT server to messages and operations specified in an XA protocol for objects exhibiting and conforming to the behaviours specified by the XA protocol.

19. The computer implemented method according to claim 18 including mapping of AT messages and AT operations by the AT server to those messages and operations specified by selected transaction protocols for objects exhibiting and conforming to the behaviours specified by said selected transaction protocols.

20. The computer implemented method according to claim 19 including building undo records for management operations equivalent to the M-SET, M-CREATE, and M-DELETE operations of CMIP protocols for objects exhibiting and conforming to the behaviours as specified in X.711 for selected CMIP protocols.

21. The method of claim 20, further comprising the below steps to prepare the undo record for a managed operation equivalent to operation as M-SET and to roll back the effecting said operation in the event the transaction enclosing said operation is aborted:
  invoking separate M-GET request(s) to get the original values of the object(s) and attribute(s) that would be overwritten by the actual M-SET;
  storing the result of said requests in an M-SET record in the undo log, and committing this record if the actual M-SET operation is successful; and
  invoking the undo record to roll back the effect of the actual operation in case of abort.

22. The method of claim 20, further comprising the below steps to prepare the undo record for a management operation equivalent to an M-CREATE operation and to roll back the effect of said operation in the event the transaction enclosing said operation is aborted:
  creating a new M-DELETE record for the target object in the undo log, and committing the record, if the actual M_CREATE operation is successful; and
  invoking the said undo record to roll back the effect of the actual operation in case of abort.

23. The method of claim 20 further comprising preparing an undo record for a management operation equivalent to an M-DELETE operation and rolling back the effect of the management operation in the event the transaction enclosing said operation is aborted:
  invoking separate M-GET requests to get the original values of the object(s) and attribute(s) that are removable by the actual M-DELETE;
  storing the result of said requests in an M-CREATE record in an undo log, and committing this record if the particular M-SET operation is successful; and
  invoking the undo record to roll back the effect of the actual operation in case of abort.

24. The computer implemented method according to claim 20 including building an undo record for management operations equivalent to SNMP-SET PDU, SNMP-SET operation for simple object instance operation for creating a row object, SNMP-SET operation for deleting a row object for objects exhibiting and conforming to the behaviours as specified in SNMP (RFC 1157 and related RFC's) and SNMP V2 (RFC 1905 and related RFC's) for said SNMP protocols.

25. The method of claim 24, further comprising preparing the undo record for a management operation equivalent to SNMP-SET operation for simple object instance and rolling back the effect of said operation in the event the transaction enclosing said operation is aborted;
  invoking separately SNMP-GET request(s) to get the original values of the object(s) and attribute(s) that would be overwritten by the actual SNMP-SET;
  storing the result of the said requests in an SNMP-SET record in the undo log, and committing this record if the actual SNMP-SET operation is successful; and
  invoking the undo record to roll back the effect of actual operation in case of abort.

26. The method of claim 24, further comprising preparing the undo record for a management operation equivalent to a SNMP-SET operation for creating a row object and to roll back the effect of said operation in the event the transaction enclosing said operation is aborting, including:
  creating a new SnmpDelReq record for the target row object in the undo log, and committing this record if the actual SNMP-SET operation to create a row object is successful; and
  invoking the said undo record to roll back the effect of the actual operation in case of abort.

27. The method of claim 24, further comprising preparing an undo record for a management operation equivalent to SNMP-SET operation for deleting a row object and to roll back the effect of the operation in the event the transaction enclosing said operation is aborting, including:
  invoking separate SNMP-GET requests to get the original values of columns of the row object that would be removed by the actual SNMP-SET operation;
  storing the result of said requests in an SnmpCreReq record for the target row object in the undo log, and committing this record if the actual SNMP-SET operation to delete a new object is successful; and
  invoking said undo record to roll back the effect of the actual operation in case of abort.

28. A computer system comprising:
  an application transaction server (ATS) configured to process a network management transaction, wherein the network management transaction comprises an atomic unit of network management requests from a plurality of sources, wherein the atomic unit commits or fails in unison; and
  a database coupled to the application transaction server for storing an undo log to enable reversal of a network management transaction performed by said application transaction server in the event of failure of any subordinate part of the network management transaction.

29. A method for performing network management, the method comprising:
  receiving a plurality of network management request messages from a plurality of sources, wherein each network management request message comprises a request to perform a network management operation affecting one or more target objects;
  performing the plurality of requested network management operations as a single network management transaction, wherein said performing the plurality of requested network management operations as a single network management transaction comprises ensuring that either 1) all of the network management operations are committed successfully; or 2) each network management operation is aborted if one or more of the network management operations fail, wherein, for a given network management operation, aborting the given network management operation comprises ensuring that the given network management operation does not affect a target object.

30. The method of claim 29, further comprising:

storing information regarding the original states of target objects to be affected by the requested network management operations, wherein the stored information is usable to undo the effects of the requested network management operations if one or more of the network management operations fail.

31. The method of claim 30, further comprising:

undoing the effects of one or more of the requested network management operations using the stored information, in the event that one or more of the network management operations fail.

32. The method of claim 31, wherein a first network management request message includes a request to perform a network management operation affecting original values associated with a first target object;

wherein said storing information regarding the original states of target objects to be affected by the requested network management operations comprises storing the original values associated with the first target object;

wherein said undoing the effects of one or more of the requested network management operations using the stored information comprises resetting the first target object to use the stored original values.

33. The method of claim 31, wherein said storing information regarding the original states of target objects to be affected by the requested network management operations comprises:

for at least one of the requested network management operations, creating an undo record, wherein the undo record specifies a command which, when executed, is operable to undo the effects of the requested network management operation;

wherein said undoing the effects of one or more of the requested network management operations using the stored information comprises executing the command specified by the undo record.

34. The method of claim 33, wherein the plurality of network management request messages comprises a plurality of Common Management Information Protocol (CMIP) messages;

wherein the command comprises one or more of:
 a CMIP M-GET message;
 a CMIP M-SET message;
 a CMIP M-CREATE message; and
 a CMIP M-DELETE message.

35. The method of claim 29, further comprising:

receiving a "begin transaction" message prior to said receiving the plurality of network management request messages, wherein the "begin transaction" message signifies that subsequently received network management request messages are to be performed as a single network management transaction;

receiving a "commit transaction" message subsequently to said receiving the plurality of network management request messages, wherein the "commit transaction" message signifies that previously received network management request messages are to be performed as a single network management transaction.

36. The method of claim 35, further comprising:

associating the plurality of network management request messages together as a single network management transaction, in response to said receiving the "begin transaction" message.

37. The method of claim 29, wherein the plurality of network management request messages are received from a network management application.

38. The method of claim 29, wherein each network management request message is a message creating according to a particular network management protocol.

39. The method of claim 38, wherein the network management protocol comprises one of:
 the Common Management Information Protocol (CMIP); or
 the Simple Network Management Protocol (SNMP).

40. The method of claim 29, wherein the plurality of network management request messages comprises one or more of:
 a CMIP M-GET message;
 a CMIP M-SET message;
 a CMIP M-CREATE message; and
 a CMIP M-DELETE message.

41. The method of claim 29, wherein each of said target objects comprises an object that conforms to behavior specified by a particular network management protocol.

42. The method of claim 29, wherein at least one of the target objects represents a particular device connected to a network.

43. A computer system for performing network management, the computer system comprising:

a processor coupled to a memory medium, wherein the memory medium stores program instructions;

wherein the processor is operable to execute the program instructions in order to:
 receive a plurality of network management request messages from a plurality of sources, wherein each network management request message includes a request to perform a network management operation affecting one or more target objects;
 perform the plurality of requested network management operations as a single network management transaction, wherein said performing the plurality of requested network management operations as a single network management transaction comprises ensuring that either 1) all of the network management operations are committed successfully; or 2) each network management operation is aborted if one or more of the network management operations fail, wherein, for a given network management operation, aborting the given network management operation comprises ensuring that the given network management operation does not affect a target object.

44. The computer system of claim 43, wherein the processor is further operable to execute the program instructions in order to:

store information regarding the original states of target objects to be affected by the requested network management operations, wherein the stored information is usable to undo the effects of the requested network management operations if one or more of the network management operations fail.

45. The computer system of claim 44, wherein the processor is further operable to execute the program instructions in order to:

undo the effects of one or more of the requested network management operations using the stored information, in the event that one or more of the network management operations fail.

46. The computer system of claim 45, wherein a first network management request message includes a request to perform a network management operation affecting original values associated with a first target object;

wherein said storing information regarding the original states of target objects to be affected by the requested network management operations comprises storing the original values associated with the first target object;

wherein said undoing the effects of one or more of the requested network management operations using the stored information comprises resetting the first target object to use the stored original values.

47. The computer system of claim 45, wherein, in performing said storing information regarding the original states of target objects to be affected by the requested network management operations, the processor is operable to:

for at least one of the requested network management operations, create an undo record, wherein the undo record specifies a command which, when executed, is operable to undo the effects of the requested network management operation;

wherein said undoing the effects of one or more of the requested network management operations using the stored information comprises executing the command specified by the undo record.

48. The computer system of claim 47, wherein the plurality of network management request messages comprises a plurality of Common Management Information Protocol (CMIP) messages;

wherein the command comprises one or more of:
 a CMIP M-GET message;
 a CMLP M-SET message;
 a CMIP M-CREATE message; and
 a CMIP M-DELETE message.

49. The computer system of claim 43, wherein the processor is further operable to execute the program instructions in order to:

receive a "begin transaction" message prior to said receiving the plurality of network management request messages, wherein the "begin transaction" message signifies that subsequently received network management request messages are to be performed as a single network management transaction; and receive a "commit transaction" message subsequently to said receiving the plurality of network management request messages, wherein the "commit transaction" message signifies that previously received network management request messages are to be performed as a single network management transaction.

50. The computer system of claim 49, wherein the processor is further operable to execute the program instructions in order to:

associate the plurality of network management request messages together as a single network management transaction, in response to said receiving the "begin transaction" message.

51. The computer system of claim 43, wherein the plurality of network management request messages are received from a network management application.

52. The computer system of claim 43, wherein each network management request message is a message creating according to a particular network management protocol.

53. The computer system of claim 52, wherein the network management protocol comprises one of:
 the Common Management Information Protocol (CMIP); or
 the Simple Network Management Protocol (SNMP).

54. The computer system of claim 43, wherein the plurality of network management request messages comprises one or more of:
 a CMIP M-GET message;
 a CMIP M-SET message;
 a CMIP M-CREATE message; and
 a CMIP M-DELETE message.

55. The computer system of claim 43, wherein each of said target objects comprises an object that conforms to behavior specified by a particular network management protocol.

56. The computer system of claim 43, wherein at least one of the target objects represents a particular device connected to a network.

57. A memory medium for performing network management, the memory medium comprising program instructions executable to:

receive a plurality of network management request messages from a plurality of sources, wherein each network management request message includes a request to perform a network management operation affecting one or more target objects;

perform the plurality of requested network management operations as a single network management transaction, wherein said performing the plurality of requested network management operations as a single network management transaction comprises ensuring that either 1) all of the network management operations are committed successfully; or 2) each network management operation is aborted if one or more of the network management operations fail, wherein, for a given network management operation, aborting the given network management operation comprises ensuring that the given network management operation does not affect a target object.

58. The memory medium of claim 57, further comprising program instructions executable to:

store information regarding the original states of target objects to be affected by the requested network management operations, wherein the stored information is usable to undo the effects of the requested network management operations if one or more of the network management operations fail.

59. The memory medium of claim 58, further comprising program instructions executable to:

undo the effects of one or more of the requested network management operations using the stored information, in the event that one or more of the network management operations fail.

60. The memory medium of claim 57, wherein each network management request message is a message creating according to a particular network management protocol.

61. The memory medium of claim 60, wherein the network management protocol comprises one of:
   the Common Management Information Protocol (CMIP); or
   the Simple Network Management Protocol (SNMP).

62. The memory medium of claim 57, wherein the plurality of network management request messages comprises one or more of:

a CMIP M-GET message;

a CMIP M-SET message;

a CMIP M-CREATE message; and a CMIP M-DELETE message.

63. The memory medium of claim 57, wherein each of said target objects comprises an object that conforms to behavior specified by a particular network management protocol.

64. The memory medium of claim 57, wherein at least one of the target objects represents a particular device connected to a network.

* * * * *